United States Patent
Lee et al.

(10) Patent No.: US 9,848,055 B1
(45) Date of Patent: Dec. 19, 2017

(54) LOCAL CLIENT DISCOVERY FOR CONTENT VIA CACHE

(71) Applicant: Google Inc., Mountain View, CA (US)

(72) Inventors: Paul Lee, Palo Alto, CA (US); Vincent Wei-Kang Chen, San Jose, CA (US); Andrew David Berkheimer, San Francisco, CA (US); Michael Youssefmir, Portola Valley, CA (US); Ankur Jain, Mountain View, CA (US); Eric Chu, Los Altos, CA (US); Erdi Chen, San Jose, CA (US)

(73) Assignee: Google Inc., Mountain View, CA (US)

( * ) Notice: Subject to any disclaimer, the term of this patent is extended or adjusted under 35 U.S.C. 154(b) by 613 days.

(21) Appl. No.: 14/141,791

(22) Filed: Dec. 27, 2013

Related U.S. Application Data (60) Provisional application No. 61/880,402, filed on Sep. 20, 2013.

(51) Int. Cl.
*G06F 15/167* (2006.01)
*H04L 29/08* (2006.01)

(52) U.S. Cl.
CPC ................................ *H04L 67/2842* (2013.01)

(58) Field of Classification Search
None
See application file for complete search history.

(56) References Cited

U.S. PATENT DOCUMENTS

| 7,697,557 | B2 | 4/2010 | Segel |
| 8,484,314 | B2 | 7/2013 | Luna et al. |
| 8,561,116 | B2 | 10/2013 | Hasek |
| 2006/0136563 | A1 | 6/2006 | Dispensa et al. |
| 2007/0161375 | A1* | 7/2007 | Danzeisen ............ H04L 69/18 455/445 |
| 2008/0080457 | A1* | 4/2008 | Cole ................ H04L 12/5692 370/342 |
| 2010/0034089 | A1 | 2/2010 | Kovvali et al. |
| 2010/0131895 | A1* | 5/2010 | Wohlert ............. H04L 65/604 715/811 |
| 2010/0177680 | A1 | 7/2010 | Fischer et al. |
| 2012/0191862 | A1 | 7/2012 | Kovvali et al. |
| 2012/0198075 | A1 | 8/2012 | Crowe et al. |
| 2013/0067064 | A1* | 3/2013 | Thapar ............... H04L 41/5029 709/224 |
| 2013/0204961 | A1 | 8/2013 | Fliam et al. |
| 2014/0089448 | A1 | 3/2014 | Geffner |
| 2014/0115114 | A1* | 4/2014 | Garmark .............. H04L 65/60 709/219 |

* cited by examiner

*Primary Examiner* — Esther B Henderson
(74) *Attorney, Agent, or Firm* — Fish & Richardson P.C.

(57) ABSTRACT

Systems and techniques are disclosed for predictively selecting media content items and providing the predicted media content items to a cache. A media client may be in communication with a cache and detect the media content items stored on the cache. Based on the detection, a media content user interface may be modified and may contain the cached media content items or links to the cached media content items.

17 Claims, 7 Drawing Sheets

LOCAL CLIENT DISCOVERY FOR CONTENT VIA CACHE

PRIORITY

This application claims the benefit of U.S. Provisional Application No. 61/880,402, filed Sep. 20, 2013.

BACKGROUND

Accessing media content, such as video files, audio files, images, promotions (e.g., advertisements) and the like may be demanding in areas where access to internet and/or data is limited or is accessible at a high cost. For example, a user using a mobile phone connected to a cellular satellite with access to the internet may pay for access to the internet based on the amount of data downloaded to the phone. As a specific example, the user may be charged $2.85 per hour at 600 Kbps, which may be a prohibitively expensive, especially for streaming media content. Further, in such areas, high latency times may also cause a user to refrain from accessing media content.

Traditional cache arrangements generally cache content reactively. For example, a traditional cache arrangement caches a video clip in response to a user viewing the video clip. Such caching is generally positioned within a service provider network and provides cost saving to a carrier/internet service provider. It does not alleviate the cost to an end user that accesses the cached video clip.

BRIEF SUMMARY

According to implementations of the disclosed subject matter, a first media content may be identified based on a media selection criterion and provided to a first cache. A media client may detect that the first media content is stored in a first cache such that the first media content is provided to the first cache based on a determination that the first media content is a suitable media content based on a media selection criterion. A media client user interface may be modified based on the detection such that the modified media client user interface contains the first media content or a link to the first media content. The modified media client user interface may be rendered to a user.

Systems and techniques according to the present disclosure enable caching media content to a cache and providing the media content to one or more end users based on the caching. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Traditionally, media content cache may responsively cache media content based on user access of the media content. For example, a video caching arrangement may cache a video that is streamed by a user on the user's mobile phone. The responsive (i.e., cached based on the user viewing the video) video may be available to the user at a subsequent time for a given amount of time (i.e., a day, until the cache is full, etc.). According to implementations of the disclosed subject matter, a cache may receive media content based on techniques disclosed herein. The cache may be configured to receive the media content at a cost that is lower than if an end user were to use a user device (e.g., a mobile phone, tablet, laptop computer, desktop computer, television, e-reader, etc.) to receive the content without the cache. Alternatively or in addition, a cache may be configured to receive the media content at a speed that is higher than if an end user were to use a user device to receive the content without the cache. Additionally, according to implementations of the disclosed subject matter, traditionally streamable media content may be accessed by a user while the user is off-line (i.e., without an active data connection). The media content may be seeded to two or more users, such as an entire community, and may be shared with additional users.

According to techniques disclosed herein, media content may be broadcast to one or more media content caches via a broadcast signal such as a satellite connection, a high speed internet connection (e.g., cable internet, DSL internet, T1 standard, T3 standard, etc.), an optical connection, or the like. The media content to be broadcast to the cache may be selected based on a prediction of what users with access to the cache may request. For example, a prediction may be made that users in a city in South Africa are likely to view a video X. The prediction may be based on a current event that occurred in the city such that the video X contains footage corresponding to the current event. A cache may contain multiple media content items and a user with access to the cache (e.g., such as via a local Wi-Fi connection) may activate a media client (e.g., an application on the user's mobile device, a webpage, etc.) that communicates with the cache. A media client user interface may be rendered to the user. Importantly, in order to maintain a seamless and uniform user experience this user interface should appear substantially as it would in the absence of any knowledge of media content in a cache and may also provide an indication to the end user as to which media content is in the cache. As an example, a user may activate an application on her mobile phone and the application may communicate with a cache located in the same café that the user is located in. The cache may contain videos Y and Z. Accordingly, the media client user interface may be rendered such that videos Y and Z are available for the user to view. As another example, the cache may contain videos Y and Z and the media client user interface may be rendered such that videos Y and Z are highlighted as cached videos and a video X is also rendered in the same interface without an indication that video X is cached. Notably, if the media client does not receive any cached videos from a cache then the media client user interface may contain content that is not indicated as cached. Both an interface with content not indicated as cache and an interface with some or all the content indicate as cached may be similar such that a user may interact with either interface in a similar manner.

Figure 3:
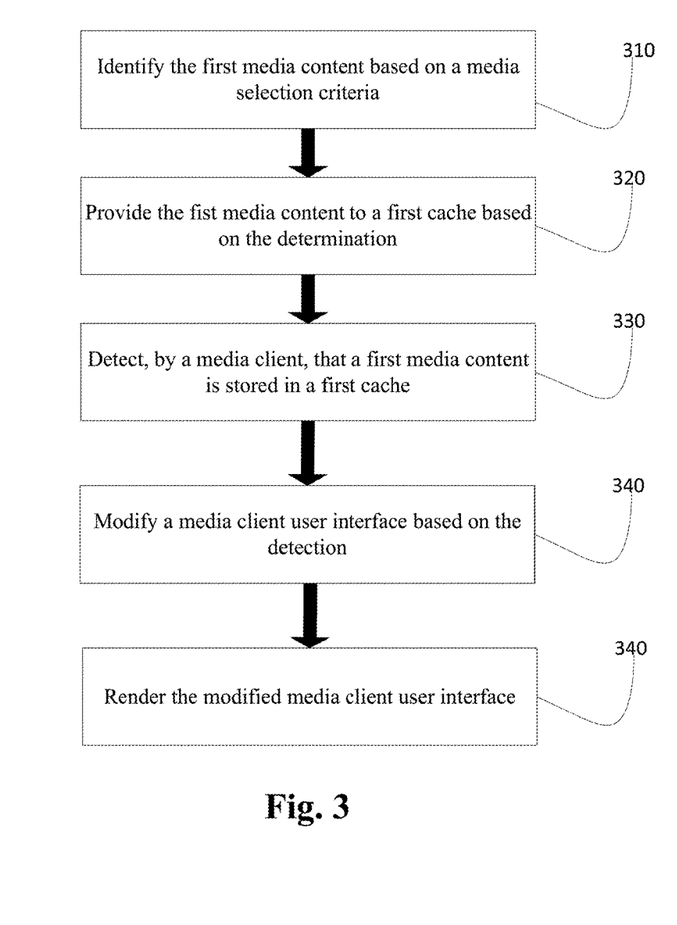
FIG. 3 shows an example illustration of modifying and rendering a media client user interface according to an implementation of the disclosed subject matter.

As shown in FIG. 3, media content to be provided to one or more caches may be identified based on one or more selection criterion at 310. A selection criteria may be any applicable predictive criterion such as a user history, a related content, a media outlet factor, a current event, a regional event, a search query factor, or the like. Related content may be content that is related to media content that a user with access to the one or more caches has previously viewed. As an example, if a user accesses a news clip regarding the president of the user's country, a related media item may be an inauguration speech that the president gave. A media outlet factor may be a prediction based on access to, view of, or contribution made to a media outlet such as a social media outlet, news media outlet, entertainment media outlet, or the like. As an example, users in a region with access to the one or more caches may view content about an artist at a high rate. Accordingly, media content that is related to that artiest may be selected to be provided to the one or more caches in that region.

At 320, the selected media content may be provided to one or more caches, according to the techniques disclosed herein (e.g., via a satellite broadcast). At 330, a media client may detect that the media content is stored in a cache that the media client has access to and, at 340, the media client's interface may be modified to reflect the detection. The modified media client user interface may be rendered to a user that accesses the media client via a user device.

According to implementations of the disclosed subject matter, a user may access media content via a cache such that the media content is predictively cached in the cache. A user may gain access to the media content predictively cached in the cache at a higher speed and/or a lower cost in comparison to the user accessing the data directly through the user device, without communicating with the cache. A cache may be a structure containing computer-readable memory and one or more of any applicable components such as a Wi-Fi access point, network connection components (e.g., wireless card, satellite data access card, Ethernet connection, etc.), a display, storage (e.g., a hard drive, flash drive, external storage connection, etc.) status indicators (e.g., LED lights), power components, or the like. The cache may be contained within a single housing or, alternatively, components of the cache may be distributed across two or more separate devices. A cache with separate components may be in communication with each other via any applicable electronic and/or physical connection such as a network connection, wired connections, wireless connections, or the like.

As disclosed herein, a cache device may cache content and can make the cached content available for a user to access via a local connection directly or indirectly to the cache device. Content may be selected for the cache device based on any applicable factor such as a user history, a related content, a media outlet factor, a current event, a regional event, a search query factor, or the like. It will be understood that although the present disclosure describes selecting content for caching based on a single user, the selection may be based on two or more users. Additionally, data from two or more uses may be analyzed by either the cache device or an external structure to select content for caching. As an example, the cache device may determine that 10 users currently accessing the cache device have a preference to view 90s music videos and only one user, of the 10 users, views Jazz music videos. Accordingly, the cache device may select 90s music videos for caching and, if storage space is a limiting factor, may omit selecting Jazz music videos. Additionally, it will be understood that a combination of factors may be applied when selecting content for caching. For example, both current events and location may be applied to determine that a video clip regarding a public speech 5 miles from a given cache should be selected for caching.

Content may be selected for a cache device based on a user history by accessing attributes regarding a user. The attributes may be provided via any applicable technique such as communication with an application (e.g., user software as disclosed herein), accessing a user account, storing user selections, or the like. A user history may be analyzed to predict content for caching. The analysis may result in the determination of any applicable selection criteria such as a genre (e.g. rock, hip-hop, alternative, electronic, horror, suspense, humor, cartoon, etc.), associated individual or group (e.g., author, artist, editor, publisher, director, actor, animal, association etc.), content length, content quality, a location associated with the content (e.g., neighborhood, country, physical area, borders, etc.), or the like.

Content may be selected for caching based on related content predictions by associating a first content with a predicted second content. A prediction may be based on any applicable technique such as matching attributes (e.g., genre, associated individual or group, content length, content quality, location, etc.). The matching may be facilitated by using tags. All or part of media content may be associated with one or more tags. The one or more tags may enable the arrangement to associate a first content with a second content that contains the same tag or a tag that is proximate to the tag for the first content.

Content may be selected for caching based on location. A location may be determined using any applicable technique such as determining GPS coordinates, triangulating a location, receiving user input regarding a location, determining a of interest location based on current events, determining a of interest location based on recently accessed content, or the like. A cache device may select content for caching based current events. The current events may be determined by any applicable technique such as monitoring news streams, trending activities, manual input, recently accessed content, a current event updating service, or the like.

A cache may receive content via any applicable connection such as a satellite connection, a high speed internet connection (e.g., cable internet, DSL internet, T1 standard, T3 standard, etc.), an optical connection, or the like. A cache may generally have access to a connection that is generally not available to a user via a user device. As an example, a community center may have a cache connected to T1 standard connection. The cache may select content for caching according to the techniques disclosed herein. The cache may also be connected to a Wi-Fi network associated with the community center. One or more users that are also connected to the same Wi-Fi network may communicate with the cache device and gain access to the cached content available via the cache device.

According to an implementation of the disclosed subject matter, a user device may be configured to detect a cache. The cache may be detected in any applicable manner such as via standard mDNS. As an example, a client device may transmit a multicast UDP probe to a specific port (e.g., 224.0.0.251 port 5353). A cache may constantly or frequently listen for one or more probes and respond on the same address that the cache is monitoring. Any applicable protocol may be used to detect the cache such as a browser plug-in and/or a DIAL (discover and launch protocol). As a specific example, a user's mobile device may transmit a UDP probe to 224.0.0.251 port 5353 every 30 seconds. The user may enter a café that contains a cache and the UDP probe to port 5353 may be received by the cache. The cache may respond with a signal on the same port 5353 such that the user's mobile device (or a media client on the user's mobile device) detects the presence of the cache.

The user device may detect the cache in any applicable manner such as via a Bluetooth™ connection, network connection (e.g., Wi-Fi, Ethernet, hot spot, etc.), radio frequency connection, infrared connection, or the like. As an example, a user's mobile phone may periodically send out an infrared signal requesting confirmation of the existence of a cache. If the user's mobile phone is within line of site of a cache with a corresponding infrared emitter, then the mobile phone may establish a connection with the cache based on receiving a confirmation of the existence of the cache. A successful detection of a cache by a user device may cause the user device to pair with the cache via a local connection. The pairing may occur by any applicable technique such as a Bluetooth™ pairing, a same-network Wi-Fi pairing (e.g., if the mobile device and the cache are on the same Wi-Fi network then both the mobile device and cache may be paired with each other), an open line of communication between a mobile device and cache, or the like. A pairing between a cache device and a mobile device may allow the mobile device to receive content from the cache device via a local connection. Essentially, a mobile device may receive content directly from a cache device via a local connection such that the cost to the user of receiving the content from the local connection is lower than the cost of receiving the content from an external data source (e.g., via a cellular data connection).

According to an implementation of the disclosed subject matter, a user may enable a media client on a user device to enable detection of a cache. The media client may be any applicable software such as a mobile application (e.g., an application purchased via an application market, an application configured for a mobile device, a tablet, etc.), a computer program (e.g., a program that runs via an operating system), or the like. The media client may initiate detection of a cache by a user device associated with the media client. For example, a user may initiate a media client on her mobile phone. Based on the initiation of the media client, the user device may activate the Wi-Fi chip on the mobile device and initiate detection of the cache. Additionally, a user may disable active detection of a cache via the media client. Essentially, mobile device battery/use may be preserved while the media client is not actively searching for a cache.

Additionally, a media client instance may be configured to initiate automatically when a user device associated with the appliance use software is powered on. A user may be able to configure media client properties and enable/disable detection of a cache via the media client. As an example, a mobile phone with the media client installed may automatically initiate the software when the mobile phone is powered on. A user may access media client properties by selecting an icon corresponding to the software and disable detection of a cache while the user is aware that a cache is not available to the user.

According to an implementation of the disclosed subject matter, a media client may be configured to detect content that is cached on the cache. The media client may detect the content by querying the cache for at least a portion of available content that is cached on the cache. Alternatively, a cache may automatically provide either a user device or the media client with a list of cached content that is/can be available for delivery by the cache. Alternatively, a user may request one or more content items and the cache device may provide either a user device or an appliance use software with information regarding whether the requested one or more content items is cached and available.

According to an implementation of the disclosed subject matter, a media client may provide information regarding cached and/or un-cached content. The media client may provide such information via any applicable technique such as by presenting the information on a user device, only providing cached content to user, providing cached content to a user via a first interface and providing un-cached content to a user via second interface, indicating that a specific content is cached or un-cached, providing a cost associated with receiving a content (e.g., the cost for cached content would be lower than un-cached content), or the like. For example, a media client may be user-facing such that the user can access content directly via the appliance use software. The media client may display a plurality of video clips to a user via a user device media client user interface. The media client user interface may contain indicators that enable a user to quickly determine whether a specific video clip is cached or if the video clip is to be downloaded from using the cellular data network.

As an illustrative example, a user may activate a media client on the user device. The client may initiate communication with a cache based on, for example, a local connection as disclosed herein. The media client may receive content information (e.g., list of available content, links to content, etc.) from a server (i.e., not the cache). The media client may communicate with the cache to determine whether the content associated with the received content information is available in the cache. If some or all of the content is available in the cache then that content is tagged as available in the cache. If a user selects a link to view content that is tagged, then the media client requests the content from the cache. If the user selects a link to view content that is not tagged, then the media client may request the content from the server. Subsequently, the content is made available to the user from either cache or the server.

Alternatively, a media client (e.g., an application that streams content, an application that provides access to streamable content, etc.) may be configured to only provide cached content to user, provide cached content to a user via a first media client user interface and providing un-cached content to a user via a second media client interface, indicate that a specific content is cached or un-cached, provide a cost associated with receiving a content, or the like.

According to implementations of the disclosed subject matter, a media client user interface may be modified based on the media content in the cache. The modification may reflect the media content in the cache such that the media client user interface renders either the cached media content or links to the cached media content. The media client user interface may be updated when the media content in the cache is updated. A media client user interface may be modified to reflect the media content in the cache in any applicable manner such as highlighting cached content (e.g., changing the color around a link to the cached media content, flashing an indicator associated with cached media content, placing a border around the cached media content, etc.), rendering the cached media content at a first location and un-cached media content at a second location, only rendering cached media content, or the like.

Figure 4:
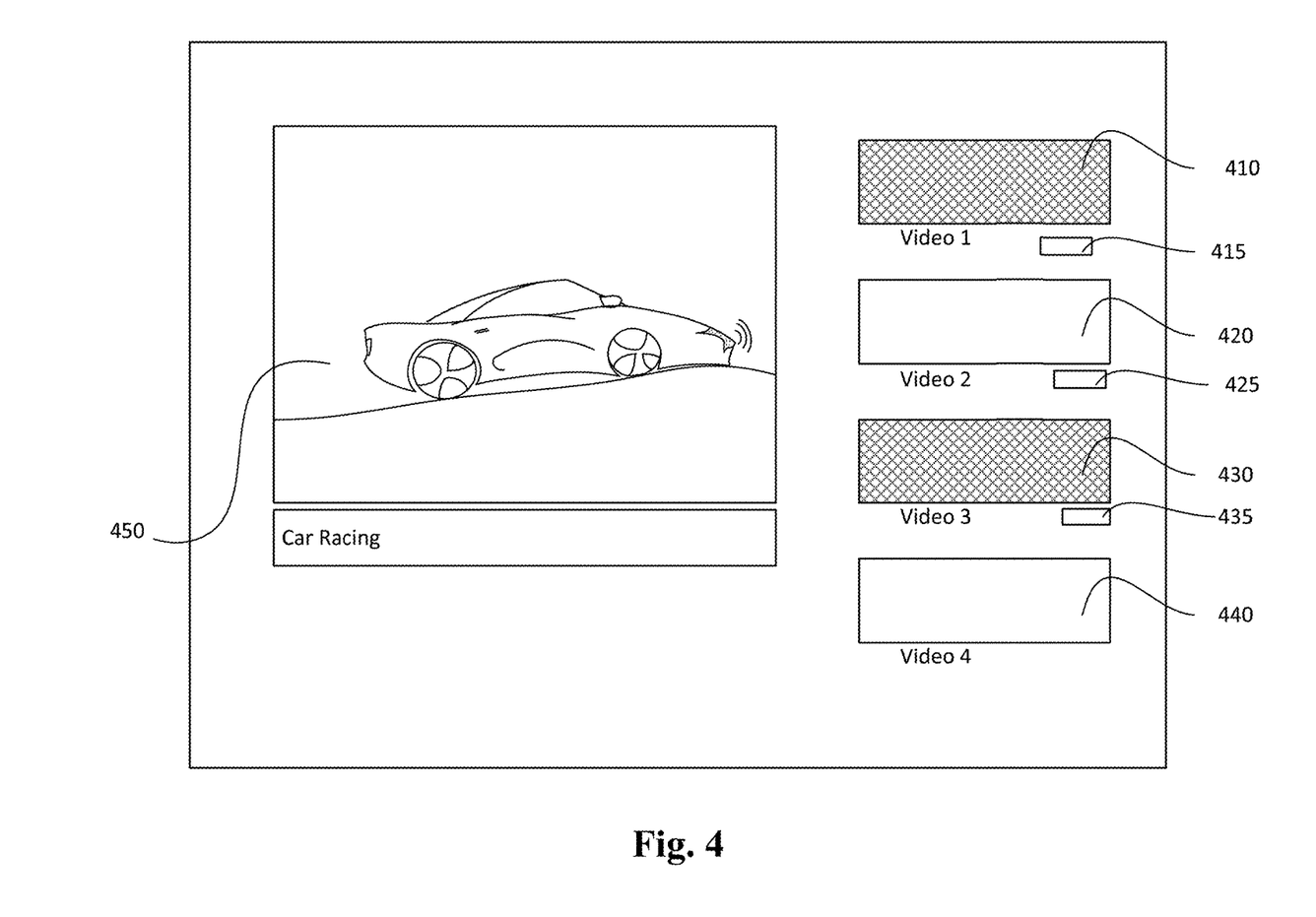
FIG. 4 shows an example visualization corresponding to a media client user interface according to an implementation of the disclosed subject matter.

As an illustrative example of the disclosed subject matter, as shown in FIG. 4, a media client may receive data regarding cached content from a cache. The media client may analyze the data and, when activated, may allow a user to easily determine whether a specific content is cached or un-cached. The media client may be accessed by a mobile device that is in connection with a cache, as shown in FIG. 4. A content display area 450 of a media client may display selected content. A first video 410 and third video 430 may be highlighted, as shown, and the highlight may indicate that the video is cached and accessible via a cache. Accordingly, a user selection of either the first video 410 or the third video 430 may enable the user to receive either the first or third video from the cache. A second video 420 and fourth video 440 may not be cached by and, thus, may not be highlighted. Accordingly, a user selection of either the second video 420 or fourth video 440 may result in receiving the corresponding video clip via a cellular data connection.

Alternatively or in addition, as shown in FIG. 4, a cache indicator may be associated with videos that are cached by a cache. Indicator 415 and 435 may indicate that the first video 410 and third video 430 are cached. The indicator may be any applicable indicator such as a colored box, a flashing light, text indicating that a corresponding video is cached, or the like.

Alternatively or in addition, as shown in FIG. 4, a cash value may be associated with videos that are available to a user. Boxes 415 and 435 may be text boxes and may contain information regarding how much it would cost a user to view the corresponding video. For example, boxes 415 and 435, corresponding to videos that are cached, may contain "$ 0.005" whereas box 425, corresponding to a video that is not cached may contain a higher amount, such as "$ 0.50". Notably, a user may receive an indication that videos 410 and 430 are cached, and thus would cost the user less to stream in comparison to videos 430 and 440 that are not cached.

Figure 5:
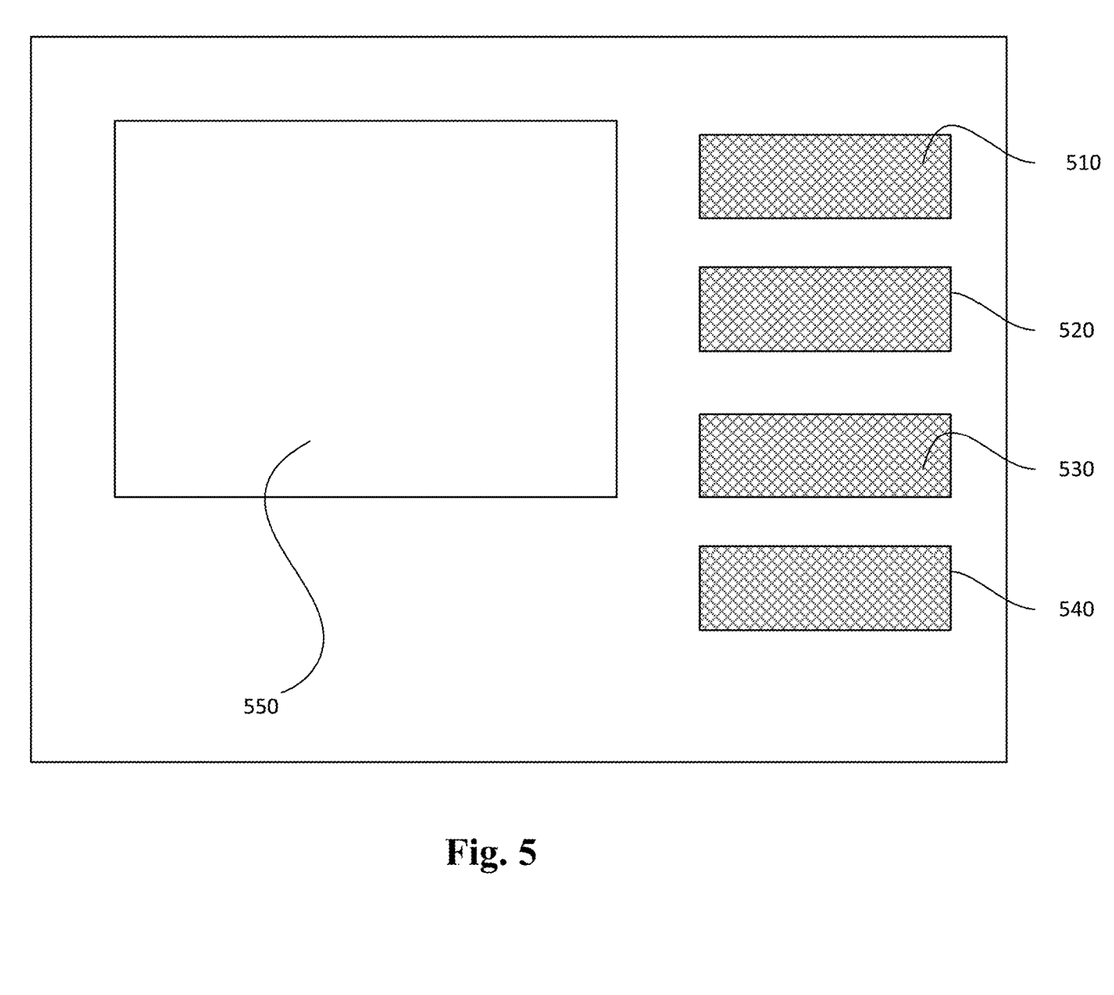
FIG. 5 shows another example visualization corresponding to a media client user interface according to an implementation of the disclosed subject matter.

As another illustrative example, as shown in FIG. 5, a media client may be configured to only display videos that are cached at a cache device. As a specific example, a parent may configure a child's mobile device to only display and allow access to content that is cached. Accordingly, as shown in FIG. 5, only cached videos 510, 520, 530, and 540 are available for selection and subsequent display in display area 550. Although not shown, a user may configure a media client to only display content that is not cached.

Figure 6A:
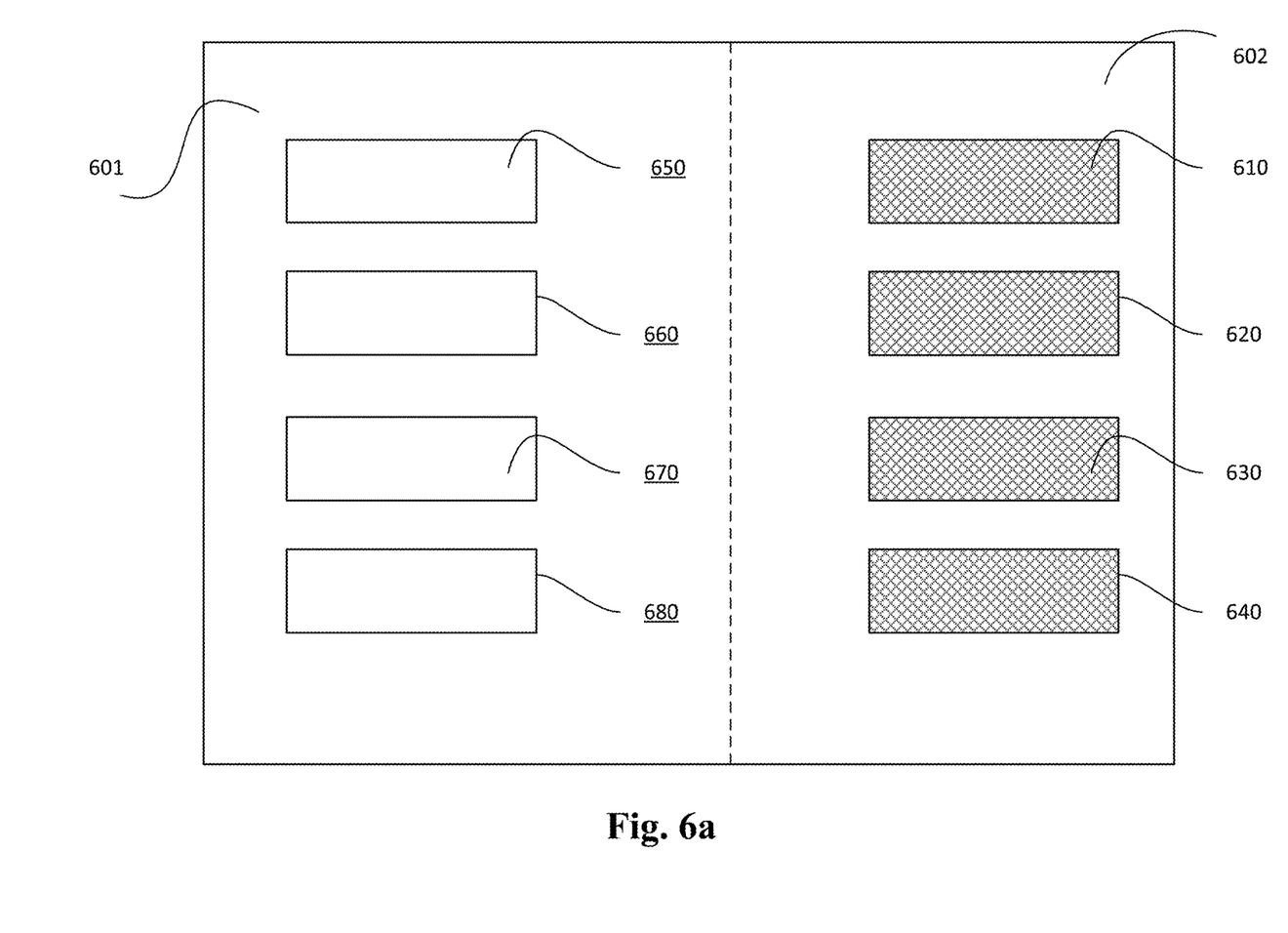
FIG. 6a shows another example visualization corresponding to a media client user interface according to an implementation of the disclosed subject matter.
Figure 6B:
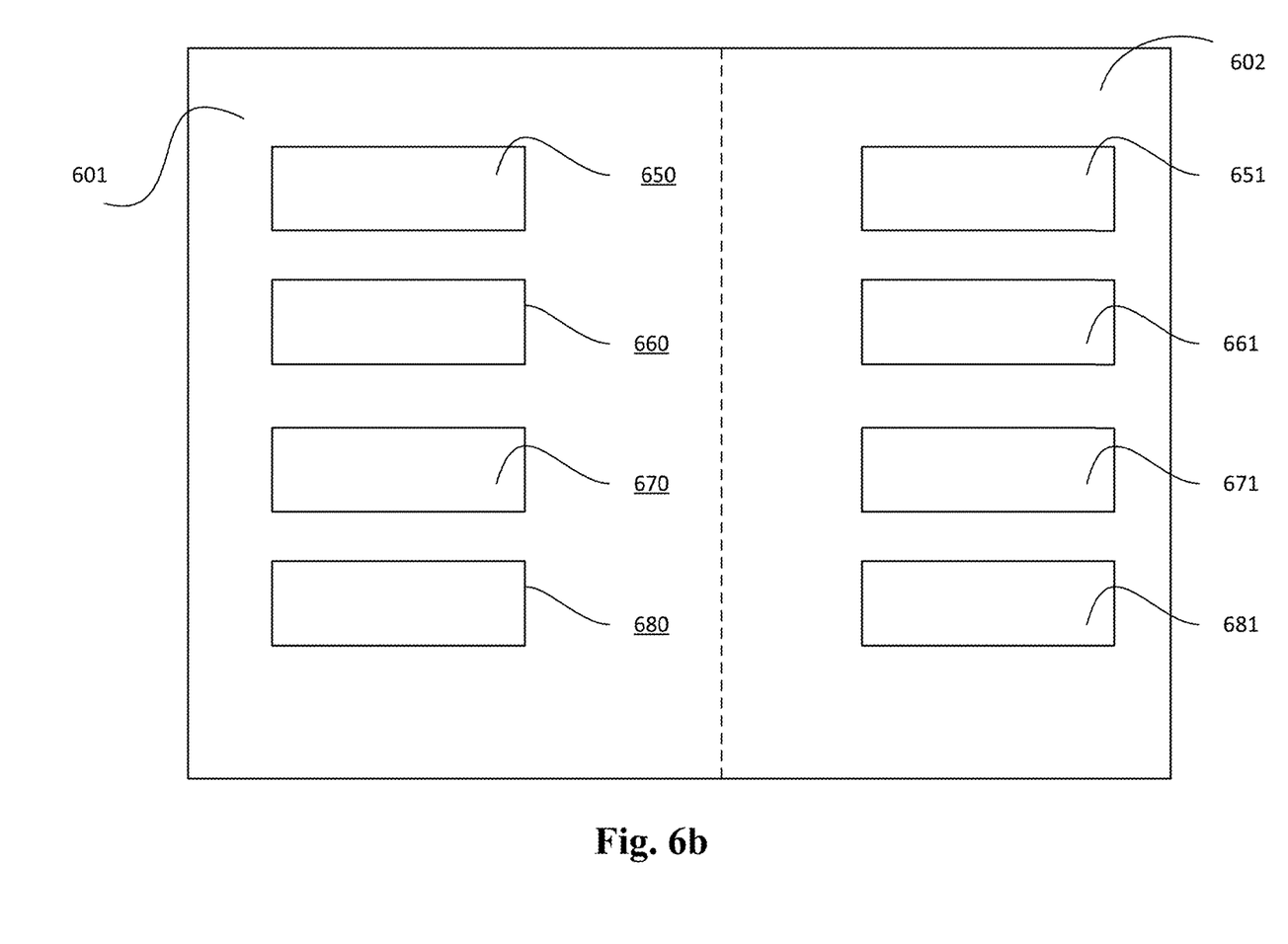
FIG. 6b shows another example visualization corresponding to a media client user interface according to an implementation of the disclosed subject matter.

As another illustrative example, as shown in FIG. 6*a*, a media client may be configured to display content that that is cached in a different section of the user interface then content that is not cached. As shown, music videos 650, 660, 670, and 680 that are not cached may be displayed on a left hand column 1101 whereas music videos 610, 620, 630, and 640 that are cached may be displayed on a right hand column 602 and may be highlighted. Notably, a user may easily be able to determine content that is cached versus content that is not cached. Alternatively, as shown in FIG. 6*b*, the media client may not have access to any cached content and may display videos 650, 660, 670, and 680 in the left hand column 601 and videos 651, 661, 671, and 681 in the right hand column 602 such that none of the videos are highlighted.

According to an implementation of the disclosed subject matter, the arrangement may verify whether a content selected by a user which was marked as cached is in fact cached. The verification may include querying either an appliance use application or a cache and requesting confirmation that the content is cached. A lack of verification may result in a message informing the user that the content previously marked as cached is no longer cached. The user may be required to manually select an option to activate the content despite the content not being cached, in order to provide the content to the user. Additionally, the arrangement may require a user action (e.g., clicking accept on a mobile device) to verify activation of content if the content is not cached, regardless of whether the content was marked as cached or not. For example, if a user selects un-cached video clip 420 in FIG. 4, then the arrangement may provide a prompt for a user stating "This video is not cached, please select 'Yes' to continue playback". The implementation may also provide an actual or estimated cost of accessing the content directly so that the user can decide if he or she wants to incur that cost to obtain the content. The user may be required to select a "Yes" prior to playback of the video.

According to implementations of the disclosed subject matter, a user may be able to download content that is cached on a cache onto a user device in connection with the cache. Content may be transferred from the cache to a user device via any applicable connection, such as the connection that enables communication between the user device and cache, as disclosed herein. A first user may share content that is cached and subsequently stored on the first user's user device with a second user. The content may be shared via any applicable connection between the first user's user device and the second user's user device.

Figure 7A:
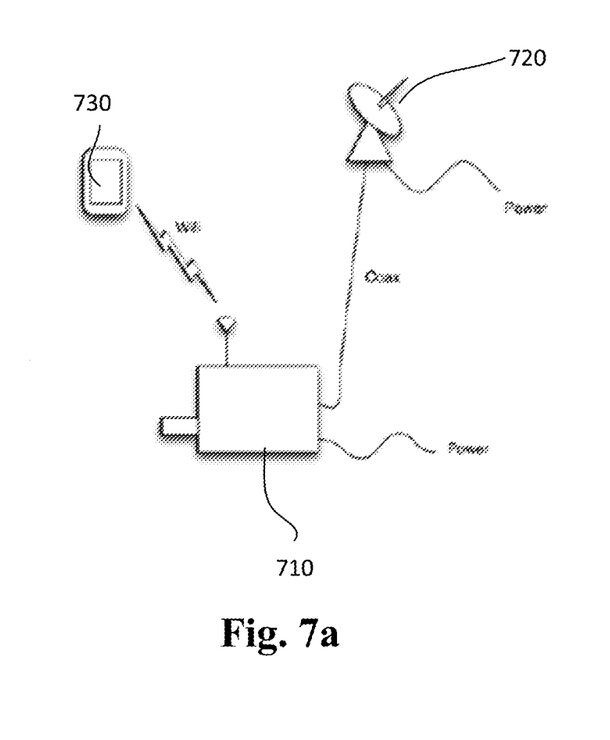
FIG. 7a shows another example visualization corresponding to a cache according to an implementation of the disclosed subject matter.
Figure 7B:
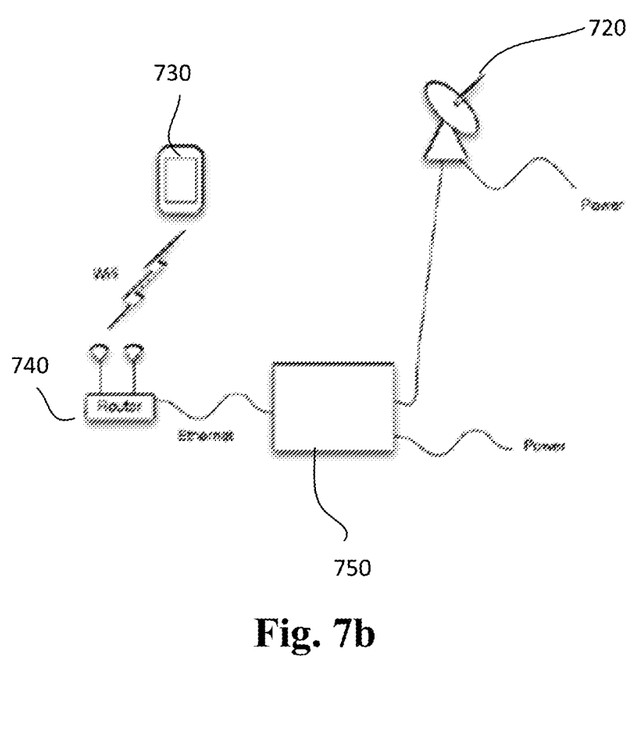
FIG. 7b shows another example visualization corresponding to a cache according to an implementation of the disclosed subject matter.

According to an implementation of the disclosed subject matter, as shown in FIGS. 7*a* and 7*b*, data may be provided to a cache via a satellite. The data may be retransmitted via a transponder configured to gather signals over a range of uplink frequencies and re-transmit them on a different set of downlink frequencies to receivers on Earth, often without changing the content of the received signal or signals. The cache may be managed locally by local software or may be managed remotely via cloud management software. The cache device may receive data via an antenna or receiver and provide it to a cache loader. As shown, in FIG. 7*a*, media content may be provided by a satellite 720 and stored at the cache 710. A user may access the cached media content via a media client on a user device 730. Similarly, as shown in FIG. 7*b*, media content may be provided by a satellite 720 and stored at the cache 750. A user may access the cached media content via a media client on a user device 730 by communicating with the cache 750 via a router 740.

According to an implementation of the disclosed subject matter, software updates may be provided to one or more caches. The software updates may be broadcasted via any applicable component such as satellite. The software update may enable the cache to modify, update, or reconfigure software stored on the cache. Similarly, a take-down notice may be received and, based on the take-down notice, a take-down instruction may be provided to one or more caches. The take-down instruction may instruct the one or more caches to remove media content from the cache or decline to serve it to any users, a given type of user, user's having given attributes, etc. Based on the take down instruction, one or more media content items may be removed from the cache such that the cache does not provide the removed media content items to a user.

According to an implementation of the disclosed subject matter, one or more media content items may be removed from a cache based on a Time-To-Live (TTL) indicator that can be implemented at the content, cache or system-wide level, or some other flush criterion. For example, a TTL indicator associated with a given piece of content may cause the content to be removed from the cache X hours after it is received at the cache, or upon a given date and time. Likewise, all the content in a cache may be removed periodically at a given time or time offset from the receipt of a piece of content. Similarly, all content in all caches may be removed at a given point based on a system-wide rule. A flush criterion may be any applicable criterion such as a cache size, a duration for which a media content item is stored, a frequency of access to the media content by users, or the like. As an example, a video P may be provided to a cache on December $1^{st}$. The video P may only have been viewed a total of 10 times by January $1^{st}$, which may be below a preset threshold amount. Accordingly, the video P may be removed from the cache.

According to an implementation of the disclosed subject matter, alternative content such as JavaScript™, CSS, HTML, images, and the like may be provided to one or more caches. The alternative content may be accessed by a client device based on a determination that the client device is configured for or contains the appropriate logic to access the cache and receive the alternative content. As an example, a public API may be provided to a third party developer and the third party developer may develop a media client that communicates with the cache such that the cache may store content associated with the third party locally and the content may be accessed by the client.

Figure 1:
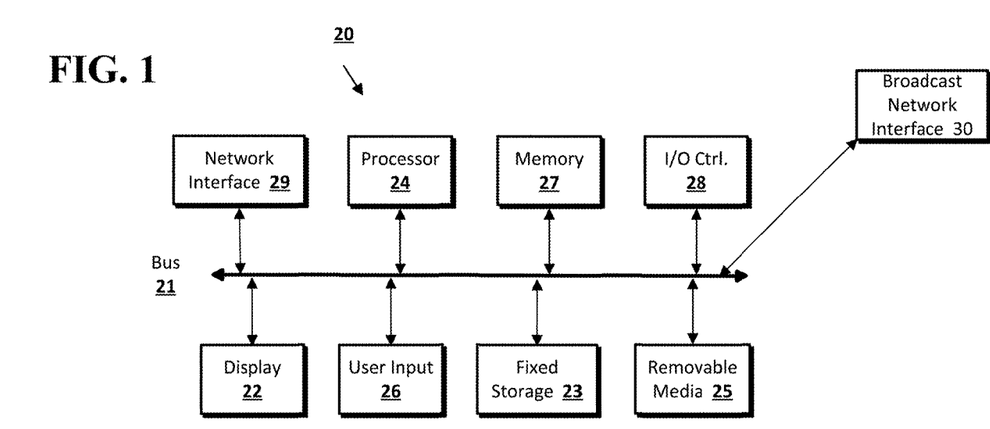
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

Figure 2:
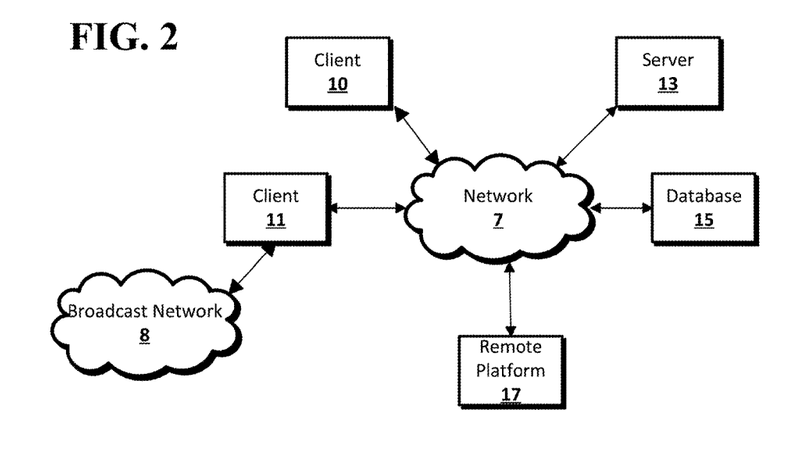
FIG. 2 shows a network configuration according to an implementation of the disclosed subject matter.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, WiFi, Zigbee™, Z-Wave™, or the like. For example, the network interface 29 may allow the computer to communicate with other computers via one or more local, wide-area, or other networks, as shown in FIG. 2. A broadcast network interface 30 may receive a broadcast transmission. The broadcast transmission may be provided via a 1 or 2-way satellite modem connected via any applicable connection such as via a coax to satellite dish/LNB.

Many other devices or components (not shown) may be connected in a similar manner (e.g., caches, servers, appliances, lighting, electric vehicle chargers, pumps, document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

FIG. 2 shows an example network arrangement according to an implementation of the disclosed subject matter. One or more clients 10, 11, such as caches, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Additionally, one or more clients 10, 11 also may receive communication from a Broadcast Network component 8. The Broadcast Network Component 8 may include a satellite configured to transmit a broadcast signal to the one or more clients 10, 11.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   detecting, by a media client on a user device, that a first media content is stored in a first cache separate from the user device, wherein the first media content is provided to the first cache based on a media selection criterion and is provided to the first cache over a first connection that is not available to the user device;
   modifying a media client user interface based on the detection, wherein the modified media client user interface comprises at least one selected from the group consisting of: the first media content and a link to the first media content, wherein the modifying the media client user interface comprises indicating that the first media content is stored in the first cache;
   rendering the modified media client user interface; and
   in response to a selection of the first media content by use of the media client user interface, requesting the first media content, by the media client, from the cache and receiving the first media content from the cache over a second connection that is different from the first connection, and wherein receiving the first media content over the second connection incurs a cost that is less than a cost incurred when the first media content is requested from a server that is different from the cache and received by the media client from the server over a third connection that is available to the user device and that is different from the first connection and the second connection.

2. The method of claim 1, further comprising:
   determining that the first media content meets the media selection criterion; and
   providing the first media content to the first cache based on determining that the first media content meets the media selection criterion.

3. The method of claim 1, wherein the first media content corresponds to a promotion.

4. The method of claim 2, wherein the first media content is provided to the first cache via a broadcast signal over the first connection.

5. The method of claim 4, further comprising providing the first media content to a second cache via the broadcast signal.

6. The method of claim 1, further comprising:
   detecting, by the user device, the first cache; and
   communicating, by the user device, with the first cache.

7. The method of claim 1, wherein detecting, by a first media client, that the first media content is stored in a first cache, further comprises:
   establishing a connection between the user device comprising the media client and the first cache over the second communication channel; and
   receiving an indication that the first media content is stored in the first cache.

8. The method of claim 1, further comprising:
   detecting a plurality of media content stored in the first cache;
   modifying the media client user interface based on detecting a plurality of media content is stored in the first cache; and
   rendering the modified media client user interface.

9. The method of claim 1, wherein the media selection criterion is one selected from the group consisting of: a user history, a related content, a media outlet factor, a current event, a regional event, and a search query factor.

10. The method of claim 9, wherein the related content is related to one or more media content previously accessed by a user.

11. The method of claim 9, wherein the media outlet is selected from the group consisting of: a social media outlet, a news media outlet, and an entertainment media outlet.

12. The method of claim 1, wherein modifying a media client user interface further comprises highlighting the first media content.

13. The method of claim 1, wherein:
   modifying a media client user interface further comprises indicating that a second media content is not stored in the first cache; and
   in response to a selection of the second media content by use of the media client user interface, requesting the second media content, by the media client, and receiving the second media content over the third connection, and wherein receiving the second media content over the third connection incurs a cost that is greater than a cost incurred when the second media content is received by the media client over the second connection.

14. The method of claim 1, further comprising storing the first media content on the user device.

15. The method of claim 1, wherein the first connection is a wired high speed internet connection, the second connection is a Wi Fi connection, and the third connection is a cellular data connection.

16. A user device, comprising:
a processing device;
a display device;
a communication system; and
a memory storing instruction executable by the processing device and that upon execution by the processing device cause the user device to perform the operations of:
detecting, by a media client executing on the user device, that a first media content is stored in a first cache, wherein the first media content is provided to the first cache based on a media selection criterion and is provided to the first cache over a first connection that is not available to the user device;
modifying a media client user interface based on the detection, wherein the modified media client user interface comprises at least one selected from the group consisting of: the first media content and a link to the first media content, wherein the modifying the media client user interface comprises indicating that the first media content is stored in the first cache;
rendering the modified media client user interface; and
in response to a selection of the first media content by use of the media client user interface, requesting the first media content, by the media client, from the cache and receiving the first media content from the cache over a second connection that is different from the first connection, and wherein receiving the first media content over the second connection incurs a cost that is less than a cost incurred when the first media content is requested from a server that is different from the cache and received by the media client from the server over a third connection that is available to the user device and that is different from the first connection and the second connection.

17. The user device of claim 16, wherein the first connection is a wired high speed internet connection, the second connection is a Wi Fi connection, and the third connection is a cellular data connection.

* * * * *